United States Patent
Cheng (10) Patent No.: US 12,047,689 B2
(45) Date of Patent: Jul. 23, 2024

(54) WHITE BALANCE COEFFICIENT CORRECTION METHOD AND ELECTRONIC DEVICE

(71) Applicant: Acer Incorporated, New Taipei (TW)

(72) Inventor: Chen-Ju Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 101 days.

(21) Appl. No.: 17/991,824

(22) Filed: Nov. 21, 2022

(65) Prior Publication Data

US 2023/0421916 A1    Dec. 28, 2023

(30) Foreign Application Priority Data

Jun. 28, 2022   (TW) ................................. 111124141

(51) Int. Cl.
*H04N 5/335*      (2011.01)
*H04N 23/45*     (2023.01)
*H04N 23/88*     (2023.01)

(52) U.S. Cl.
CPC ............. *H04N 23/88* (2023.01); *H04N 23/45* (2023.01)

(58) Field of Classification Search
CPC ................................ H04N 9/73; H04N 23/88
See application file for complete search history.

(56) References Cited

U.S. PATENT DOCUMENTS 9,319,653 B2 *   4/2016   Lu .......................... H04N 23/10
9,674,496 B2 *   6/2017   Lu .......................... H04N 23/88

FOREIGN PATENT DOCUMENTS

| CN | 107197225 | 4/2019 |
|---|---|---|
| CN | 110740306 | 1/2020 |
| CN | 112655193 | 4/2021 |
| CN | 112689140 | 4/2021 |
| CN | 113132694 | 7/2021 |
| TW | I399503 | 6/2013 |

* cited by examiner

*Primary Examiner* — Gary C Vieaux
(74) *Attorney, Agent, or Firm* — JCIPRNET (57) ABSTRACT

Disclosed are a white balance coefficient correction method and an electronic device. A look-up table is recorded. The look-up table includes a target color temperature and multiple corresponding first white balance coefficients, and multiple offset color temperatures and multiple corresponding second white balance coefficients. An actual color temperature based on the target color temperature in a correction environment is obtained. An automatic white balance correction operation is performed in the correction environment using the first image sensor to obtain multiple original white balance coefficients. One of the offset color temperatures in the look-up table is obtained according to the actual color temperature in response to the actual color temperature meeting an offset condition. The original white balance coefficients are corrected according to a difference between the second white balance coefficients corresponding to the one of the offset color temperatures and the first white balance coefficients.

20 Claims, 4 Drawing Sheets

WHITE BALANCE COEFFICIENT CORRECTION METHOD AND ELECTRONIC DEVICE

CROSS-REFERENCE TO RELATED APPLICATION

This application claims the priority benefit of Taiwanese application no. 111124141, filed on Jun. 28, 2022. The entirety of the above-mentioned patent application is hereby incorporated by reference herein and made a part of this specification.

BACKGROUND

Technical Field

The disclosure relates to an electronic device. In particular, the disclosure relates to a white balance coefficient correction method and an electronic device.

Description of Related Art

At present, most electronic products are equipped with image capturing modules, so that users may operate the electronic products to take pictures or record videos. Not only images can be recorded, but various subsequent applications such as video conferencing or augmented reality may also be performed based on the captured images. Gaps are present between sensing results generated by different image capturing modules under the same light source environment on the basis of various assembly factors or differences in element properties. In other words, sensing results generated by the image sensing modules under the same light source environment are inconsistent if the same white balance coefficient is applied to different image sensing modules. Therefore, a correction procedure of the white balance coefficient may be performed for the image sensing modules before leaving the factory to obtain a dedicated white balance coefficient instead of simply applying the same white balance coefficient to all image sensing modules.

However, in a correction environment for correcting the white balance coefficient, the factory may use a plurality of light source apparatuses to simultaneously correct a plurality of image capture modules in parallel to improve the correction efficiency. However, the light source apparatuses may experience aging and the like as the service lives increase, and wavelengths of light emitted by different light source apparatuses under the same color temperature setting conditions are also different. Therefore, the correction result of the white balance coefficient may not be in line with expectations due to offset in the color temperature of light emitted by the light source apparatuses, and color inconsistency may be shown between images captured by different image capturing modules based on their respective white balance coefficients.

SUMMARY

The disclosure provides a white balance coefficient correction method and an electronic device.

An embodiment of the disclosure provides a white balance coefficient correction method adapted for an electronic device including a first image sensor. The method includes the following. A look-up table is recorded. The look-up table includes a target color temperature, a plurality of offset color temperatures, a plurality of first white balance coefficients corresponding to the target color temperature, and a plurality of second white balance coefficients respectively corresponding to the offset color temperatures. An actual color temperature is obtained based on the target color temperature in a correction environment. A plurality of original white balance coefficients are obtained by configuring the first image sensor to perform an automatic white balance correction operation in the correction environment. One of the offset color temperatures in the look-up table is obtained according to the actual color temperature in response to the actual color temperature meeting an offset condition. The original white balance coefficients are corrected according to a difference between the second white balance coefficients corresponding to the one of the offset color temperatures and the first white balance coefficients corresponding to the target color temperature to obtain a plurality of corrected white balance coefficients.

An embodiment of the disclosure provides an electronic device including a first image sensor, a storage device, and a processor. The storage device records a look-up table. The look-up table includes a target color temperature, a plurality of offset color temperatures, a plurality of first white balance coefficients corresponding to the target color temperature, and a plurality of second white balance coefficients respectively corresponding to the offset color temperatures. The processor is coupled to the first image sensor and the storage device and is configured to: obtain an actual color temperature based on the target color temperature in a correction environment; obtain a plurality of original white balance coefficients by configuring the first image sensor to perform an automatic white balance correction operation in the correction environment; obtain one of the offset color temperatures in the look-up table according to the actual color temperature in response to the actual color temperature meeting an offset condition; and correct the original white balance coefficients according to a difference between the second white balance coefficients corresponding to the one of the offset color temperatures and the first white balance coefficients corresponding to the target color temperature to obtain a plurality of corrected white balance coefficients.

Based on the foregoing, in the embodiments of the disclosure, the look-up table may be recorded in the storage device, and the look-up table includes the correspondence between the target color temperature, the offset color temperatures, the first white balance coefficients, and the second white balance coefficients. The actual color temperature corresponding to the target color temperature in the correction environment may be detected. When the actual color temperature is offset from the target color temperature, one of the offset color temperatures may be looked up according to the actual color temperature and the corresponding second white balance coefficients may be obtained. Therefore, the original white balance coefficients generated by performing an automatic white balance correction operation may be corrected according to the difference between the first white balance coefficients and the looked-up second white balance coefficients. Accordingly, even if the actual color temperature in the correction environment is offset due to aging of the light source apparatus, the corrected white balance coefficient in line with expectations may still be obtained in the end, improving accuracy and reliability of white balance gain correction.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Some embodiments of the disclosure accompanied with the drawings will be described in detail below. For reference numerals used in the descriptions below and shown in different drawings, the same reference numerals will be regarded as the same or similar elements. These embodiments are only a part of the disclosure and do not disclose all possible implementations of the disclosure. More specifically, these embodiments are merely examples of the method and the device within the claim scope of the disclosure.

Figure 1:
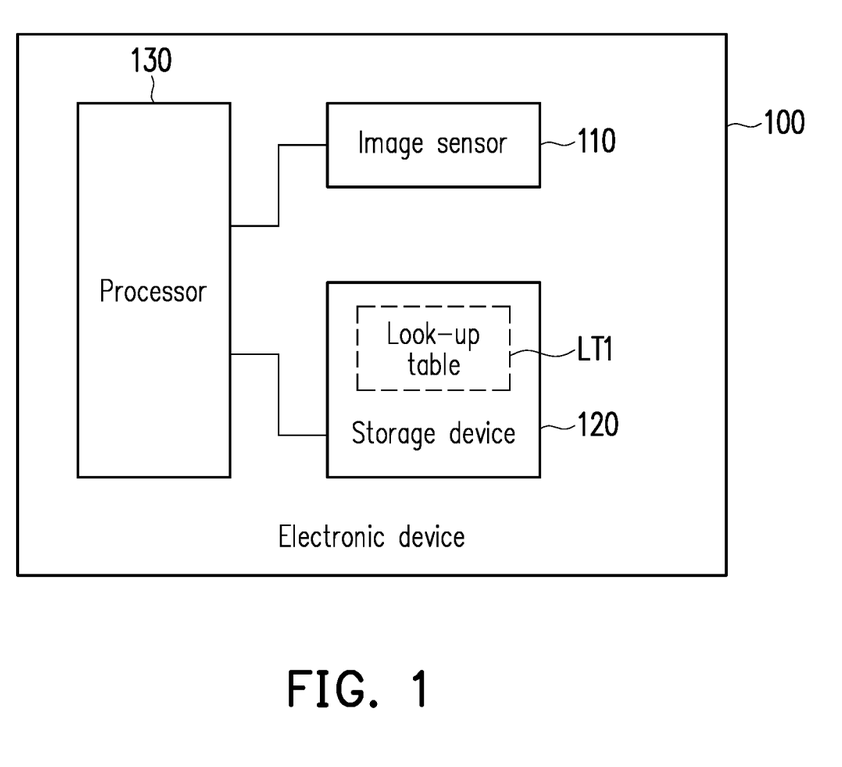
FIG. 1 is a schematic diagram of an electronic device according to an embodiment of the disclosure.

FIG. 1 is a schematic diagram of an electronic device according to an embodiment of the disclosure. With reference to FIG. 1, in different embodiments, an electronic device 100 may be, for example, a notebook computer, a smart TV, a tablet computer, a game console, or a mobile phone among other electronic devices with an image capturing function, which is not limited by the disclosure. In FIG. 1, the electronic device 100 may include an image sensor 110 (i.e., a first image sensor), a storage device 120, and a processor 130.

In some embodiments, the image sensor 110 is configured for image sensing. The image sensor 110 may include a photosensitive device, for example, a charge coupled device (CCD), a complementary metal-oxide semiconductor (CMOS) device, or other devices, which is not limited by the disclosure. The image sensor 110 may form a camera module of the electronic device 100 together with other elements (e.g., a lens, an aperture, and the like).

The storage device 120 may be configured to store data such as images, instructions, programming codes, or software modules, and may be any type of fixed or removable random access memory (RAM), read-only memory (ROM), flash memory (flash memory), hard disk, or other similar devices, integrated circuits, and a combination thereof.

The processor 130 is coupled to the image sensor 110 and the storage device 120, and is, for example, a central processing unit (CPU), an application processor (AP), or other programmable general-purpose or special-purpose microprocessors, digital signal processor (DSP), image signal processor (ISP), graphics processing unit (GPU), or other similar devices, integrated circuits, and a combination thereof.

The processor 130 may access and execute software modules recorded in the storage device 120 to implement the white balance coefficient correction method in the embodiments of the disclosure. The software modules may be broadly interpreted to denote instructions, instruction sets, codes, programming codes, programs, applications, software suites, threads, processes, functions, and the like, be it referred to as software, firmware, intermediate software, microcode, hardware description languages, or the like.

Figure 2:
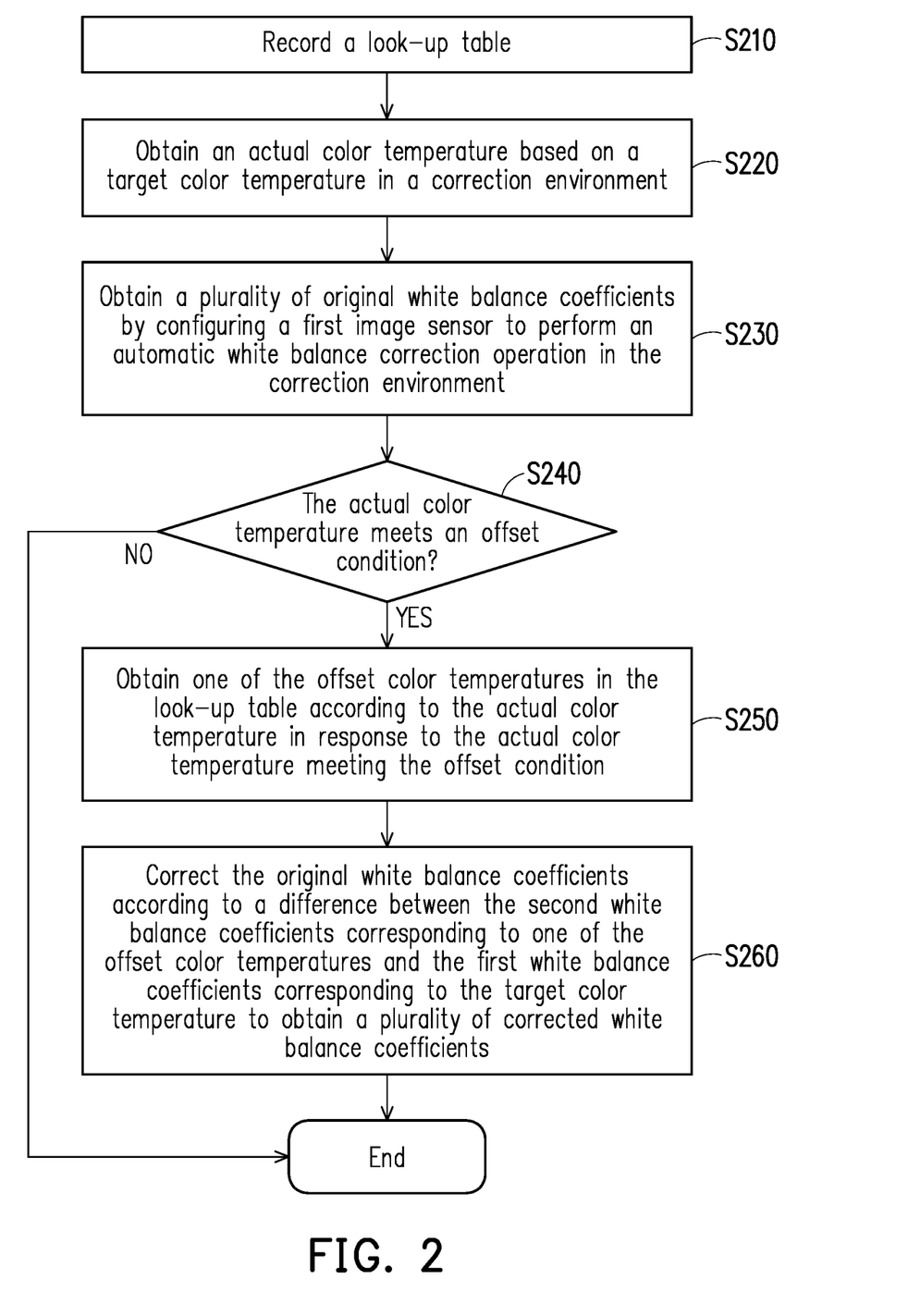
FIG. 2 is a flowchart of a white balance coefficient correction method according to an embodiment of the disclosure.
Figure 4:
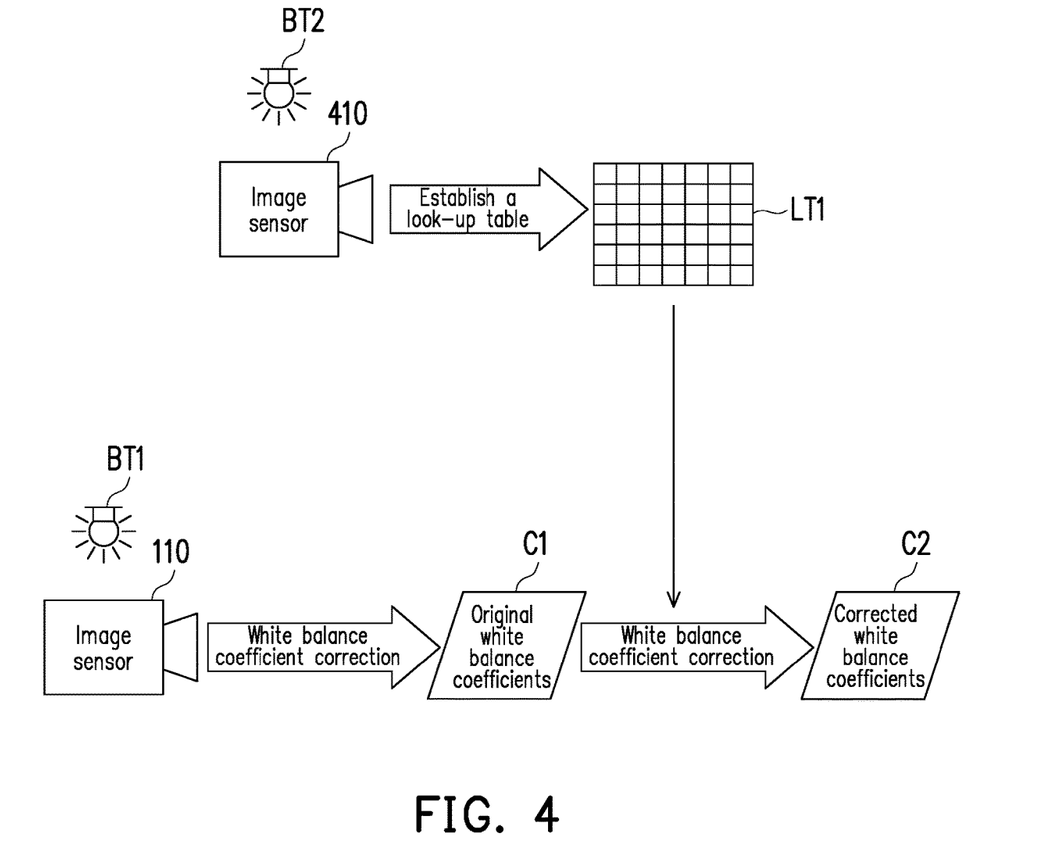
FIG. 4 is a diagram showing an application scenario according to an embodiment of the disclosure.

FIG. 2 is a flowchart of a white balance coefficient correction method according to an embodiment of the disclosure. With reference to FIG. 2, the method of this embodiment may be performed by the electronic device 100 of FIG. 1. Details of each step of FIG. 2 accompanied with the elements shown in FIG. 1 will be described below, and will be aided with FIG. 4 to facilitate understanding of the concepts of the disclosure. FIG. 4 is a diagram showing an application scenario according to an embodiment of the disclosure.

First, in step S210, the storage device 120 records a look-up table LT1. The look-up table LT1 includes a target color temperature, a plurality of offset color temperatures, a plurality of first white balance coefficients corresponding to the target color temperature, and a plurality of second white balance coefficients respectively corresponding to offset color temperatures. The plurality of offset color temperatures are determined based on the target color temperature, and the number of offset color temperatures is not limited by the disclosure. In some embodiments, the offset color temperatures and the target color temperature may form an arithmetic progression, and the common difference thereof may be determined depending on the actual application, which is not limited by the disclosure.

For example, Table 1 may be an example of the look-up table LT1 stored in storage device 120.

TABLE 1

| Color temperature (K) | CIE 1931 coordinates | | RGB response value | | | White balance coefficient | |
|---|---|---|---|---|---|---|---|
| | x | y | R | G | B | R/G | B/G |
| 5500 | 0.3324 | 0.341 | 80 | 100 | 120 | 0.8 | 1.2 |
| 5200 | 0.3397 | 0.3472 | 85 | 100 | 108 | 0.85 | 1.08 |
| 5000 | 0.3451 | 0.3516 | 90 | 100 | 102 | 0.9 | 1.02 |
| 4800 | 0.3509 | 0.3562 | 95 | 100 | 93 | 0.95 | 0.93 |
| 4500 | 0.3607 | 0.3635 | 100 | 100 | 88 | 1 | 0.88 |

The target color temperature in the look-up table LT1 may be "5000 K", and the offset color temperatures may respectively be "5500 K", "5200 K", "4800 K", and "4500 K". The first white balance coefficients corresponding to the target color temperature include a red-to-green ratio (R/G) coefficient of "0.9" and a blue-to-green ratio (B/G) coefficient of "1.02". The offset color temperatures each correspond to a group of second white balance coefficients. For example, the second white balance coefficients corresponding to the offset color temperature of "5500 K" include a R/G coefficient of "0.8" and a B/G coefficient of "1.2".

In the embodiments of the disclosure, based on the look-up table LT1, the processor 140 may correct offset of the white balance coefficient caused by offset of the color temperature of a light source apparatus BT1 in a correction environment of the electronic device 100. Note that the look-up table LT1 recorded in the storage device is established based on sensing performed through one or more image sensors under an ideal case of light source.

Figure 3:
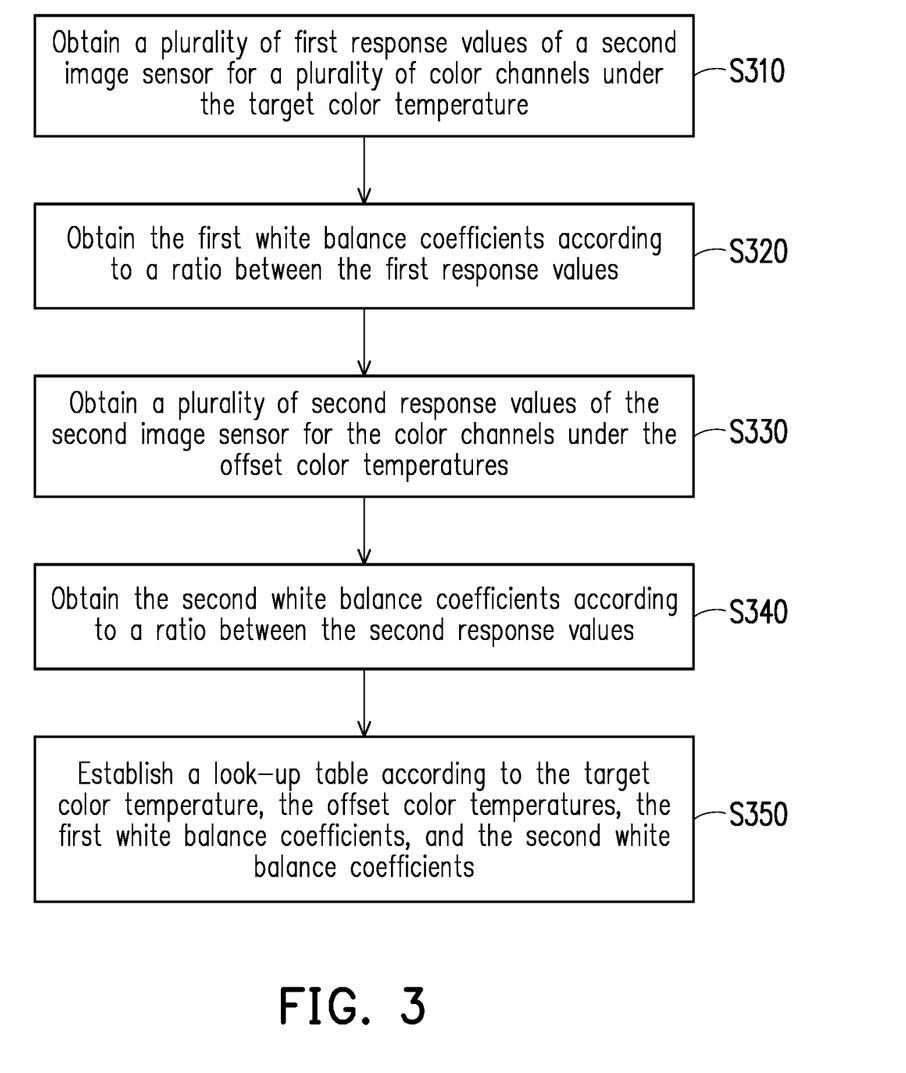
FIG. 3 is a flowchart of establishing a look-up table according to an embodiment of the disclosure.

To be specific, FIG. 3 is a flowchart of establishing a look-up table according to an embodiment of the disclosure. With reference to FIG. 3 and FIG. 4, each step shown in FIG. 3 may be performed by a correction device including or being connected to an image sensor 410 (a second image sensor), and the correction device is a computer device with computing capability, such as a notebook computer and the like. In addition, the image sensor 410 performs sensing under illumination of a light source apparatus BT2, and a color temperature of light emitted by the light source apparatus BT2 with an adjustable color temperature is not offset. Moreover, for convenience in describing the disclosure, Table 1 will be taken as the look-up table LT1 for description below.

In step S310, the correction device obtains a plurality of first response values of the image sensor 410 for a plurality of color channels under the target color temperature. In step S320, the correction device obtains the first white balance coefficients according to a ratio between the first response values. As shown in Table 1, when the color temperature of the light source apparatus BT2 is set to the target color temperature of "5000 K", the image sensor 410 may perform sensing and obtain an R channel response value of "90", a G channel response value of "100", and a B channel response value of "102" corresponding to the RGB channels. Next, the correction device may obtain an R/G coefficient of "0.9" according to a ratio between the R channel response value of "90" and the G channel response value of "100", and may obtain a B/G coefficient of "1.02" according to a ratio between the B channel response value of "102" and the G channel response value of "100".

In step S330, the correction device obtains a plurality of second response values of the image sensor 410 for the color channels under the offset color temperatures. In step S340, the correction device obtains the second white balance coefficients according to a ratio between the second response values. As shown in Table 1, the offset color temperature of "4500 K" is taken as an example. When the color temperature of the light source apparatus BT2 is set to the offset color temperature of "4500 K", the image sensor 410 may perform sensing and obtain an R channel response value of "100", a G channel response value of "100", and a B channel response value of "88" corresponding to the RGB channels. Next, the correction device may obtain an R/G coefficient of "1" according to a ratio between the R channel response value of "100" and the G channel response value of "100", and may obtain a B/G coefficient of "0.88" according to a ratio between the B channel response value of "88" and the G channel response value of "100". By analogy, the second white balance coefficients corresponding to other offset color temperatures may also be obtained based on similar operations.

In step S350, the correction device establishes the look-up table LT1 according to the target color temperature, the offset color temperatures, the first white balance coefficients, and the second white balance coefficients. As can be seen accordingly, the look-up table LT1 may represent white balance coefficient information under the ideal state of light source.

With reference back to the flows of FIG. 2, in step S220, the processor 130 obtains an actual color temperature based on a target color temperature in a correction environment. To be specific, when the white balance coefficients of the electronic device 100 are to be corrected, the electronic device 100 may be placed in a light box or other correction environments, and the light source apparatus BT1 in the correction environment is set to the target color temperature. However, based on the aging or other factors of the light source apparatus BT1, gaps may be present between the actual color temperature of the light source apparatus BT1 and the target color temperature.

In some embodiments, the processor 130 may estimate the actual color temperature by utilizing the image sensor 110 and some color temperature detection algorithms. The color temperature detection algorithms may be, for example but not limited to, a gray world algorithm or a white point statistical algorithm. Alternatively, in some embodiments, the actual color temperature may be acquired through sensing performed by an XYZ color sensor or other color temperature sensors connected to the processor 130.

In step S230, the processor 130 obtains a plurality of original white balance coefficients C1 by configuring the image sensor 110 to perform an automatic white balance correction operation in the correction environment. In some embodiments, the processor 130 obtains a plurality of original response values of the image sensor 110 for a plurality of color channels under the actual color temperature to obtain the original white balance coefficients C1 according to a ratio between the original response values. The original response values include an R channel response value, a G channel response value, and a B channel response value. The original white balance coefficients C1 include an R/G coefficient and a B/G coefficient. To reduce the influence of assembly tolerances, differences in element properties, and various other factors for the accuracy of automatic white balance processing of the electronic device 100, the processor 130 performs the automatic white balance correction operation based on the actual color temperature in the correction environment and obtains the plurality of original white balance coefficients C1 dedicated to the electronic device 100.

In step S240, the processor 130 determines whether the actual color temperature meets an offset condition. In other words, the processor 130 determines whether the actual color temperature is obviously offset from the target color temperature. If the determination result is negative in step S240, it means that the actual color temperature is not obviously offset from the target color temperature, i.e., the color temperature of the light source apparatus BT is in line with expectations. Then, the processor 130 may write the original white balance coefficients C1 into the storage device 120 without performing other correction operations by utilizing the look-up table LT1. Comparatively, if the determination result is positive in step S240, then in step S250, the processor 130 obtains one of the offset color temperatures in the look-up table LT1 according to the actual color temperature in response to the actual color temperature meeting the offset condition.

In some embodiments, the processor 130 determines whether a difference value between the actual color temperature and the target color temperature is greater than an offset critical value to determine whether the actual color temperature meets the offset condition. The offset critical value may be determined depending on the actual application, which is not limited by the disclosure. If the difference value between the actual color temperature and the target color temperature is greater than the offset critical value, the processor 130 selects one of the offset color temperatures being closest to the actual color temperature from the look-up table LT1. Taking Table 1 as an example, assuming that the actual color temperature is "4580 K", the processor 130 selects the closest offset color temperature of "4500 K" from the look-up table LT1.

In step S260, the processor 130 corrects the original white balance coefficients C1 according to a difference between the second white balance coefficients corresponding to the one of the offset color temperatures and the first white balance coefficients corresponding to the target color temperature to obtain a plurality of corrected white balance coefficients C2. For example, taking Table 1 as an example, the processor 130 may adjust the original white balance coefficients C1 according to the difference value between the second white balance coefficients corresponding to the offset color temperature of "4500 K" being closest to the actual color temperature and the first white balance coefficients corresponding to the target color temperature of "5000 K". In some embodiments, the processor 130 may determine an adjustment parameter according to the difference value according to some predetermined functions or other look-up tables. The adjustment parameter may include an adjustment ratio and/or an adjustment value. Next, the processor 130 adjusts the original white balance coefficients C1 according to the adjustment parameter, for example, multiplying the original white balance coefficients C1 by the adjustment ratio, adding or subtracting the adjustment value the adjustment value based on the original white balance coefficients C1, or the like.

In some embodiments, the processor 130 calculates the difference between the second white balance coefficients corresponding to the one of the offset color temperatures and the first white balance coefficients, and obtains an adjustment ratio based on the difference. Therefore, the processor 130 may correct the original white balance coefficients C1 according to the adjustment ratio to obtain the plurality of corrected white balance coefficients C2. The corrected white balance coefficients include a corrected R/G coefficient and a corrected B/G coefficient. The corrected white balance coefficients C2 may be recorded in the storage device 120. Accordingly, the electronic device 100 may perform an automatic white balance adjustment to captured images according to the corrected white balance coefficients C2, improving the stability and accuracy of automatic white balancing.

For example, taking Table 1 as an example, the processor 130 may first calculate that 0.1 is a difference value between a R/G coefficient of "1" corresponding to the offset color temperature of "4500 K" being closest to the actual color temperature and a R/G coefficient of "0.9" corresponding to the target color temperature of "5000 K". Next, the processor 130 obtains an adjustment ratio of 10% according to the difference value of "0.1" and the R/G coefficient of "1" corresponding to the offset color temperature of "4500 K". Therefore, the processor 130 may multiply an original R/G coefficient in the original white balance coefficients C1 by (100%–10%). For example, assuming that the original R/G coefficient is "0.92", then the R/G coefficient in the corrected white balance coefficients C2 is 0.92*(100%–10%)=0.828. The processor 130 may obtain a corrected B/G coefficient according to the same operation principle. The corrected R/G coefficient and the corrected B/G coefficient correspond to the target color temperature of "5000 K", and may be recorded in the storage device 120.

Note that the processing procedures of the white balance coefficient correction method performed by at least one processor are not limited to the embodiments above. For example, the steps may be performed in other sequences. Further, any two or more steps of the steps above may be combined, and some of the steps may also be modified. Alternatively, steps other than the steps above may also be performed.

In addition, the embodiments above are described by taking a single target color temperature as an example, while those skilled in the art can understand that similar operations may be repeatedly performed based on other target color temperatures. For example, it is assumed that the target color temperatures may respectively be 6500 K of a D65 light source, 4150 K of a CWF light source, and 2800 K of an A light source. The process flows shown in FIG. 2 may correspondingly be performed three times to obtain three groups of corrected white balance coefficients corresponding to the D65 light source, the CWF light source, and the A light source. In addition, the three groups of corrected white balance coefficients may serve for performing a translation process on an original color temperature curve to establish a corrected color temperature curve for the electronic device 100 to perform automatic white balancing. The electronic device 100 may perform an automatic white balance correction on captured images according to the corrected color temperature curve and the room temperature of the capturing scene. Correspondingly, the look-up table recorded in the storage device 120 may also include a plurality of target color temperatures, a plurality of offset color temperatures of each of the target color temperatures, the first white balance coefficients corresponding to each of the target color temperatures, and the second white balance coefficients corresponding to each of the offset color temperatures.

In summary of the foregoing, in the embodiments of the disclosure, the white balance coefficients in the pre-established look-up table may be obtained based on the ideal case of light source. When the actual color temperature in the correction environment of automatic white balance correction is offset from the target color temperature, the corresponding second white balance coefficients and the first white balance coefficients corresponding to the target color temperature may be obtained from the look-up table according to the actual color temperature. Therefore, the original white balance coefficients generated from performing the automatic white balance correction operation may be adjusted according to the difference between the first white balance coefficients and the second white balance coefficients. Accordingly, even if the actual color temperature in the correction environment is offset, the corrected white balance coefficients in line with expectations may still be obtained in the end, improving accuracy and reliability of automatic white balancing, and achieving consistent white balance processing results between electronic products of the same model after leaving the factory.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A white balance coefficient correction method adapted for an electronic device comprising a first image sensor, the method comprising:
   recording a look-up table, wherein the look-up table comprises a target color temperature, a plurality of offset color temperatures, a plurality of first white balance coefficients corresponding to the target color temperature, and a plurality of second white balance coefficients respectively corresponding to the offset color temperatures;
   obtaining an actual color temperature based on the target color temperature in a correction environment;
   obtaining a plurality of original white balance coefficients by configuring the first image sensor to perform an automatic white balance correction operation in the correction environment;
   obtaining one of the offset color temperatures in the look-up table according to the actual color temperature in response to the actual color temperature meeting an offset condition; and correcting the original white balance coefficients according to a difference between the second white balance coefficients corresponding to the one of the offset color temperatures and the first white balance coefficients corresponding to the target color temperature to obtain a plurality of corrected white balance coefficients.

2. The white balance coefficient correction method according to claim 1, wherein correcting the original white balance coefficients according to the difference between the second white balance coefficients corresponding to the one of the offset color temperatures and the first white balance coefficients corresponding to the target color temperature comprises:
- calculating the difference between the second white balance coefficients corresponding to the one of the offset color temperatures and the first white balance coefficients;
- obtaining an adjustment ratio according to the difference; and
- correcting the original white balance coefficients according to the adjustment ratio.

3. The white balance coefficient correction method according to claim 1, further comprising:
- obtaining a plurality of first response values of a second image sensor for a plurality of color channels under the target color temperature;
- obtaining the first white balance coefficients according to a ratio between the first response values;
- obtaining a plurality of second response values of the second image sensor for the color channels under the offset color temperatures;
- obtaining the second white balance coefficients according to a ratio between the second response values; and
- establishing the look-up table according to the target color temperature, the offset color temperatures, the first white balance coefficients, and the second white balance coefficients.

4. The white balance coefficient correction method according to claim 1, wherein obtaining the original white balance coefficients by configuring the first image sensor to perform the automatic white balance correction operation in the correction environment comprises:
- obtaining a plurality of original response values of the first image sensor for a plurality of color channels under the actual color temperature to obtain the original white balance coefficients according to a ratio between the original response values.

5. The white balance coefficient correction method according to claim 1, wherein obtaining the one of the offset color temperatures in the look-up table according to the actual color temperature in response to the actual color temperature meeting the offset condition comprises:
- determining whether a difference value between the actual color temperature and the target color temperature is greater than an offset critical value; and
- selecting one of the offset color temperatures being closest to the actual color temperature in response to the difference value between the actual color temperature and the target color temperature being greater than the offset critical value.

6. The white balance coefficient correction method according to claim 1, wherein the original white balance coefficients and the corrected white balance coefficients comprise a red-to-green ratio coefficient and a blue-to-green ratio coefficient.

7. The white balance coefficient correction method according to claim 1, wherein a light source apparatus in the correction environment is set to the target color temperature, and the automatic white balance correction operation is performed through the source apparatus in the correction environment.

8. The white balance coefficient correction method according to claim 1, wherein the step of correcting the original white balance coefficients according to the difference between the second white balance coefficients corresponding to the one of the offset color temperatures and the first white balance coefficients corresponding to the target color temperature comprises:
- determining an adjustment parameter according to the difference according to a predetermined function or other look-up table; and
- adjusting the original white balance coefficients according to the adjustment parameter through multiplying the original white balance coefficients by the adjustment parameter or through adding or subtracting the adjustment value the adjustment parameter based on the original white balance coefficients.

9. The white balance coefficient correction method according to claim 1, wherein the method further comprises:
- writing the original white balance coefficients into a storage device without utilizing the look-up table in response to the actual color temperature not meeting an offset condition.

10. The white balance coefficient correction method according to claim 1, wherein the offset color temperatures and the target color temperature form an arithmetic progression.

11. An electronic device comprising:
- a first image sensor;
- a storage device recording a look-up table, wherein the look-up table comprises a target color temperature, a plurality of offset color temperatures, a plurality of first white balance coefficients corresponding to the target color temperature, and a plurality of second white balance coefficients respectively corresponding to the offset color temperatures;
- a processor coupled to the first image sensor and the storage device and being configured to:
- obtain an actual color temperature based on the target color temperature in a correction environment;
- obtain a plurality of original white balance coefficients by configuring the first image sensor to perform an automatic white balance correction operation in the correction environment;
- obtain one of the offset color temperatures in the look-up table according to the actual color temperature in response to the actual color temperature meeting an offset condition; and
- correct the original white balance coefficients according to a difference between the second white balance coefficients corresponding to the one of the offset color temperatures and the first white balance coefficients corresponding to the target color temperature to obtain a plurality of corrected white balance coefficients.

12. The electronic device according to claim 11, wherein the processor is further configured to:
- calculate the difference between the second white balance coefficients corresponding to the one of the offset color temperatures and the first white balance coefficients;
- obtain an adjustment ratio according to the difference; and
- correct the original white balance coefficients according to the adjustment ratio.

13. The electronic device according to claim 11, wherein a plurality of first response values of a plurality of color channels are obtained by a second image sensor under the target color temperature, a plurality of second response values of the color channels are obtained by the second image sensor under the offset color temperatures, the first white balance coefficient is a ratio between the first response values, and the second white balance coefficient is a ratio between the second response values.

14. The electronic device according to claim 11, wherein the processor is further configured to:
   obtain a plurality of original response values of the first image sensor for a plurality of color channels under the actual color temperature to obtain the original white balance coefficients according to a ratio between the original response values.

15. The electronic device according to claim 11, wherein the processor is further configured to:
   determine whether a difference value between the actual color temperature and the target color temperature is greater than an offset critical value; and
   select one of the offset color temperatures being closest to the actual color temperature in response to the difference value between the actual color temperature and the target color temperature being greater than the offset critical value.

16. The electronic device according to claim 11, wherein the original white balance coefficients and the corrected white balance coefficients comprise a red-to-green ratio coefficient and a blue-to-green ratio coefficient.

17. The electronic device according to claim 11, wherein a light source apparatus in the correction environment is set to the target color temperature, and the automatic white balance correction operation is performed through the source apparatus in the correction environment.

18. The electronic device according to claim 11, wherein the processor is further configured to:
   determine an adjustment parameter according to the difference according to a predetermined function or other look-up table; and
   adjust the original white balance coefficients according to the adjustment parameter through multiplying the original white balance coefficients by the adjustment parameter or through adding or subtracting the adjustment value the adjustment parameter based on the original white balance coefficients.

19. The electronic device according to claim 11, wherein the processor is further configured to:
   write the original white balance coefficients into a storage device without utilizing the look-up table in response to the actual color temperature not meeting an offset condition.

20. The electronic device according to claim 11, wherein the offset color temperatures and the target color temperature form an arithmetic progression.

* * * * *